March 18, 1952 B. G. BJORNSON 2,589,662

RADIOTELEPHONE RECEIVING SYSTEM

Filed April 23, 1946

3 Sheets-Sheet 1

INVENTOR
B. G. BJORNSON
BY
B. F. Stoddard
ATTORNEY

INVENTOR
B. G. BJORNSON
BY
B H Stoddard
ATTORNEY

March 18, 1952

B. G. BJORNSON 2,589,662

RADIOTELEPHONE RECEIVING SYSTEM

Filed April 23, 1946

3 Sheets-Sheet 3

INVENTOR
B. G. BJORNSON

BY

B. F. Stoddard
ATTORNEY

Patented Mar. 18, 1952

2,589,662

UNITED STATES PATENT OFFICE 2,589,662

RADIOTELEPHONE RECEIVING SYSTEM

Bjorn G. Bjornson, New York, N. Y., assignor to Bell Telephone Laboratories, Incorporated, New York, N. Y., a corporation of New York Application April 23, 1946, Serial No. 664,171

25 Claims. (Cl. 250—20)

This invention relates to radio telephone receiving systems and, more particularly, to circuits for determining the relative values of the signal and noise energies in such systems.

The invention is particularly useful in urban mobile and coastal radio telephone systems wherein the fixed transmitting station may have associated with it a number of receivers scattered over a wide area and wherein the mobile transmitters are energized only during the actual transmission of speech, such as by push-button switching or voice-controlled switching.

An object of the invention is to facilitate the measurement of signal and noise energies in radio telephone receiving systems that are intermittently conditioned for reception.

Another object of the invention is to provide for the measurement of signal and noise energies in a radio telephone receiving system during the intervals of speech reception; that is, during talk spurts.

An additional object is to provide improved means for measuring the relative signal-to-noise ratio of each channel of a multichannel radio telephone diversity receiving system.

A further object is to provide improved means for automatically selecting the channel having the least noise in a multichannel radio telephone diversity receiving system.

These and other objects of the invention are accomplished by sampling the received energy during successive syllables and also during the intervals between successive syllables and then comparing the integrated values of a preassigned number of samples in each case. The sampling operations are performed during short uniform time intervals, the duration of which is independent of the character or strength of the received signals. The currents obtained by the sampling operations are rectified to produce unidirectional pulses of one polarity for samples of speech energies and of the opposite polarity for samples obtained during the absence of speech energies. For indicating and measuring purposes, the average values of the rectified pulses are determined by integrating the values of a preassigned number of samples. For control purposes in a multichannel diversity receiving system, integrated rectified pulses from each channel are supplied to a selecting device which selects the channel having the least noise.

These and other features of the invention are explained more fully in connection with the following detailed description of the drawings in which.

Figure 1:
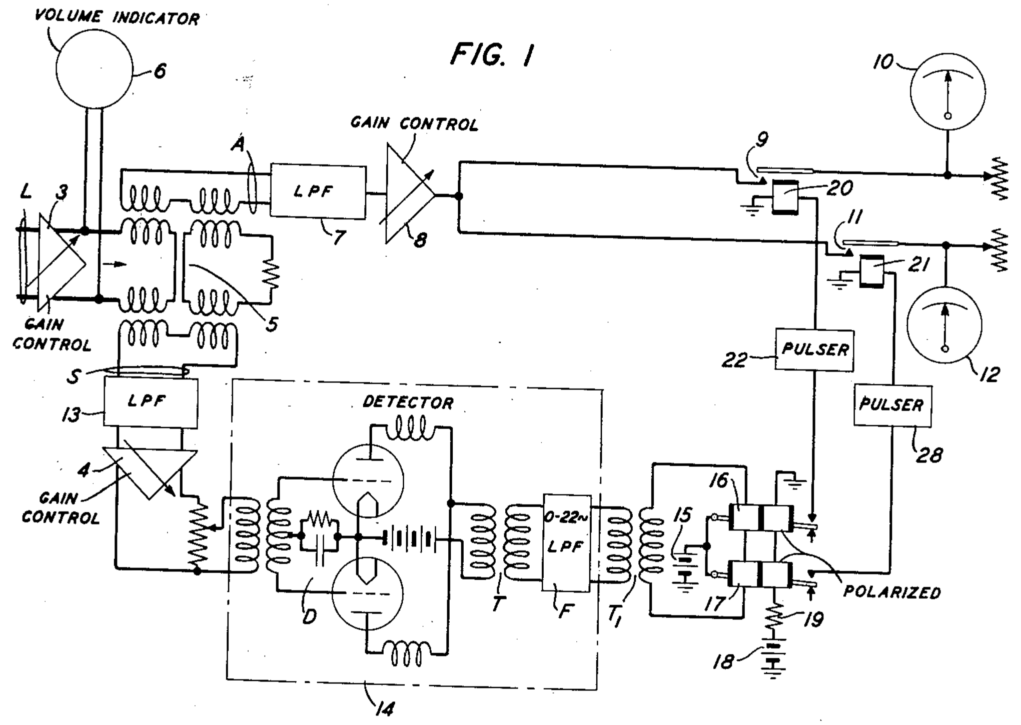
Fig. 1 is a schematic diagram of an improved circuit for measuring signal and noise energies in a radio telephone receiving system.

In Fig. 1, a line L carrying speech waves and the usual accompanying noise waves is connected through a gain control device 3 to a hybrid coil 5. A volume indicator 6 has its input connected between the gain control device 3 and the hybrid coil 5. The hybrid coil 5 transfers a portion of the electric wave energy from line L to a measuring circuit A comprising a low-pass filter 7 and a gain control device 8. The output of the gain control device 8 is connected to a circuit having two parallel paths, one of which includes a normally open control switch 9 and a meter 10 and the other includes a similar normally open control switch 11 and a meter 12. The hybrid coil 5 also transfers a portion of the electric wave energy from the line L to a syllabic switching circuit S comprising a low-pass filter 13, a gain control device 4, and a syllabic detector circuit 14 comprising a push-pull vacuum tube detector D having its output coupled through a low frequency transformer T to a low-pass filter F which has a cut-off at about 22 cycles.

The output of the syllabic detector circuit 14 is coupled through a low frequency transformer $T_1$ to the operating windings in series of two polarized switching relays 16 and 17. The biasing windings of these relays are supplied in series with biasing current from a battery 18 through a resistance 19. A battery 15 is connected to the armatures of both relays 16 and 17 in parallel. An armature contact of relay 16 is connected to a pulsing device 22 which controls the operation of the switch 9, and an armature contact of relay 17 is connected to a similar pulsing device 28 which controls the operation of the switch 11. The control switch 9 is shown to consist of the armature and contact of a pulsing relay 20 and the control switch 11 is similarly shown to consist of the armature and contact of a pulsing relay 21.

The syllabic detector circuit 14 is the same as the syllabic detector circuit shown in Fig. 1 of Patent 2,284,617 issued June 2, 1942, to H. L. Barney which, in turn, is similar to the syllabic detector circuit disclosed in Patent 1,939,680 issued December 19, 1933, to H. J. Fisher. The disclosures of these two patents are incorporated herein by reference as a part of this specification. As the operation of a syllabic detector of this type is fully described in the above-mentioned patents, it is sufficient for the purposes of this specification to state that, when speech waves are detected by the detector D and are passed on through the transformer T and the low-pass filter F, they produce in the output of the filter a current impulse of one polarity at the beginning of a syllable and another current impulse of opposite polarity at the end of a syllable. At the beginning of a syllable, the amplitude of the speed waves is increasing with the result that current of positive polarity will flow through the operating windings of relay 16 and 17. During the latter part of a syllable, the amplitude of the speed waves is decreasing and current will flow through the operating windings of relays 16 and 17 in a negative direction.

This change in the polarity of the current flowing through the operating windings of relays 16 and 17 is utilized for switching purposes by connecting the biasing windings of relays 16 and 17 in reverse order so that relay 16 is polarized to operate its armature during the flow of positive current through its operating winding at the beginning of a syllable and relay 17 is polarized to operate its armature during the flow of negative current at the end of a syllable. Noise currents which do not have a syllabic characteristic resembling speech will not operate the armature of either relay 16 or relay 17 because the relatively steady rectified current due to such noise waves is not passed by the low-pass filter F. The low frequency transformer $T_1$ functions to suppress the direct current component of the detector output current from the operating windings of relays 16 and 17.

The pulsers 22 and 28 are similar to the pulsing circuits which are shown in detail in Figs. 3 and 4 and which are fully explained in connection with the detailed description of the operation of the systems shown in Figs. 3 and 4. It is sufficient to state that each of the pulsers 22 and 28 comprises circuit means for generating a current pulse of fixed duration in response to the operation of its associated switching relay. In a preferred embodiment of the invention, each pulse lasts for 0.035 second. The current pulses generated by the pulsers 22 and 28 are supplied to their respective pulsing relays 20 and 21 for effecting the operation of the control switches 9 and 11. Each of the pulsing relays 20 and 21 is designed to hold its armature operated only for the duration of a pulse. Since the biasing windings of relays 16 and 17 are connected in reverse order, only one of them will operate its armature at any one time with the result that the control switches 9 and 11 will always be operated alternatively.

During the operation of the system shown in Fig. 1, speech waves and the usual accompanying noise waves are received over the line L terminating in the hybrid coil 5 which transfers a portion of the received waves to the measuring circuit A and another portion to the syllabic switching circuit S. These waves are maintained at a substantially constant volume by means of the gain control devices 3 and 8 because, if they should be too strong, they would overload the system and, on the other hand, if they should be too weak, the system would fail to operate. Since the low-pass filter F introduces a short time delay, relay 16 will not operate its armature until the incoming speech currents have risen to a relatively high value. Therefore, when relay 16 operates its armature to initiate the operation of the pulsing device 22, relatively strong speech currents will be present in the measuring circuit A. When the pulse generated by the pulsing device 22 effects the operation of the control switch 9 to close the circuit leading to the meter 10, these strong speech currents, which will now be at or near their maximum strength, will be impressed upon the meter 10 for the duration of the pulse to produce a deflection $D_1$ of the meter indicator.

Similarly, due to the time delay introduced by the filter F, relay 17 will not operate its armature until the speech currents in the measuring circuit A have fallen to a relatively low value. Thus, during the last part of a speech syllable, relay 16 will release its armature, control switch 9 will open, and relay 17 will operate its armature to cause the pulsing device 28 to generate a pulse of current which, in turn, will effect the closing of the control switch 11. The relatively strong noise currents which are now present in the measuring circuit A will be impressed upon the meter 12 for the duration of the pulse to produce a deflection $D_2$ of the meter indicator.

The difference D between the deflections $D_1$ and $D_2$ is a measure of the relative speech energies present in the measuring circuit A during these two pulse periods. This difference D will vary with the character and amplitude of the speech currents and will also be modified by the operating characteristics of the system. As a general rule, transmitting conditions are best when the difference D is large and the deflection $D_2$ is small. Since the deflection $D_1$ is produced during the time that speech currents are at a maximum and the deflection $D_2$ is produced during the time that noise currents are at a maximum, the deflection $D_1$ is an indication of the strength of the speech currents and the deflection $D_2$ is an indication of the strength of the noise currents. The ratio of these two deflections will indicate the signal-to-noise ratio of the currents in the measuring circuit A and the average of a series of these ratios obtained from similar measurements over an extended period of time will indicate the average signal-to-noise ratio of the system.

Figure 2:
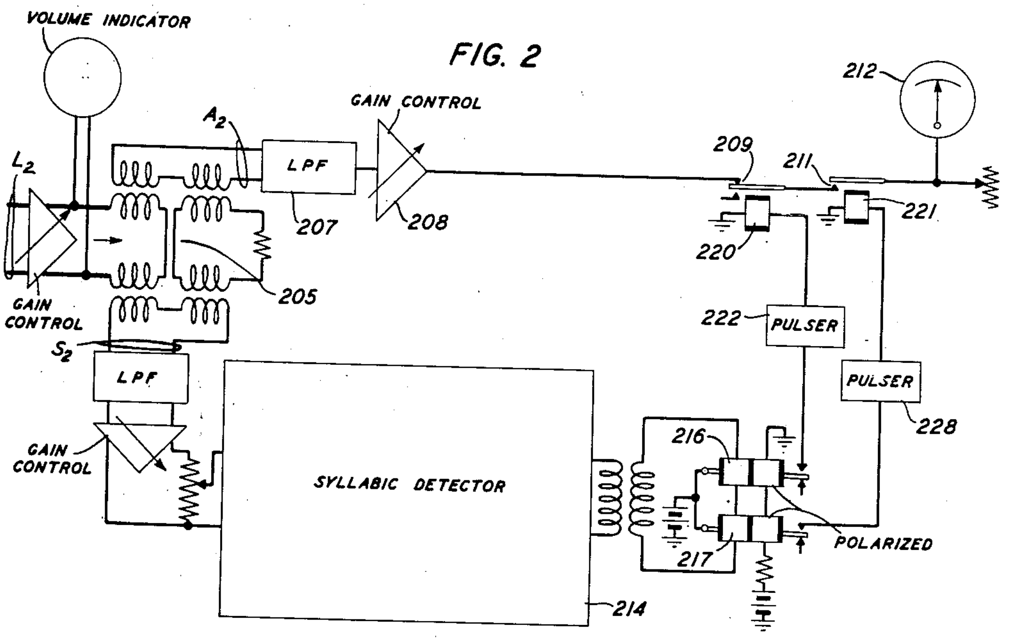
Fig. 2 is a schematic diagram of an improved circuit for measuring noise energies during the intervals between speech syllables in a radio telephone receiving system.

Fig. 2 shows a system somewhat similar to the system shown in Fig. 1 but designed to measure only noise currents during the intervals of speech reception. Speech waves and the usual accompanying noise waves carried by line $L_2$ are delivered to a hybrid coil 205 which transfers a portion of these waves to the measuring circuit $A_2$. The measuring circuit $A_2$ comprises only one path which includes a low-pass filter 207, a meter 212, a gain control device 208, and two control switches 209 and 211 connected in series, the control switch 209 being normally closed and the control switch 211 being normally opened. Another portion of the waves from line $L_2$ is transferred by the hybrid coil 205 to the syllabic switching circuit $S_2$ which includes a syllabic detector 214 similar to the syllabic detector 14 shown in detail in Fig. 1. The syllabic switching circuit $S_2$ also includes two polarized switching relays 216 and 217 which operate their armatures in the same manner as the switching relays 16 and 17 in the circuit of Fig. 1; that is, relay 216 will operate its armature during the first, or rising, part of a speech syllable and relay 217 will operate its armature during the last, or falling, part of a speech syllable.

During the operation of the system of Fig. 2, operation of the armature of relay 217 effects the operation of the pulsing device 228 which produces a pulse of current to energize the pulsing relay 221 thereby closing the normally open control switch 211 which remains closed for the duration of the pulse. During this pulse period, the measuring circuit $A_2$ will be closed and the electric wave energy from the hybrid coil 205 will be applied to the meter 212 for measurement. Since the syllabic detector 214 includes a low-pass filter, similar to the filter F in Fig. 1, which introduces a short time delay, the control switch 211 will be closed during the time that speech waves in the measuring circuit $A_2$ are at a minimum. Therefore, the wave energies applied to the meter 212 will consist chiefly of noise waves and the deflection of the meter indicator will be an indication of the strength of these waves.

At the termination of the pulse, the winding of relay 221 will be no longer energized and will consequently release its armature thereby opening the measuring circuit $A_2$.

If a second speech syllable should arrive before the control switch 211 has been opened in response to the cessation of the pulse from the pulsing device 228, relay 216 would operate its armature to initiate the operation of its associated pulsing device 222. The pulser 222 would then produce a pulse of current which would cause relay 220 to operate its armature thereby opening the measuring circuit $A_2$ to prevent the first, or rising, part of the incoming speech syllable from being applied to the meter 212. The pulsing devices 222 and 228 are similar to the pulsing circuits which are shown in detail in Figs. 3 and 4 and which are fully explained in connection with the detailed description of the operation of the systems shown in Figs. 3 and 4.

Thus, by means of the system shown in Fig. 2, it is possible to obtain a series of measurements of the noise currents that are present in the line $L_2$ during the intervals of speech reception.

Figure 3:
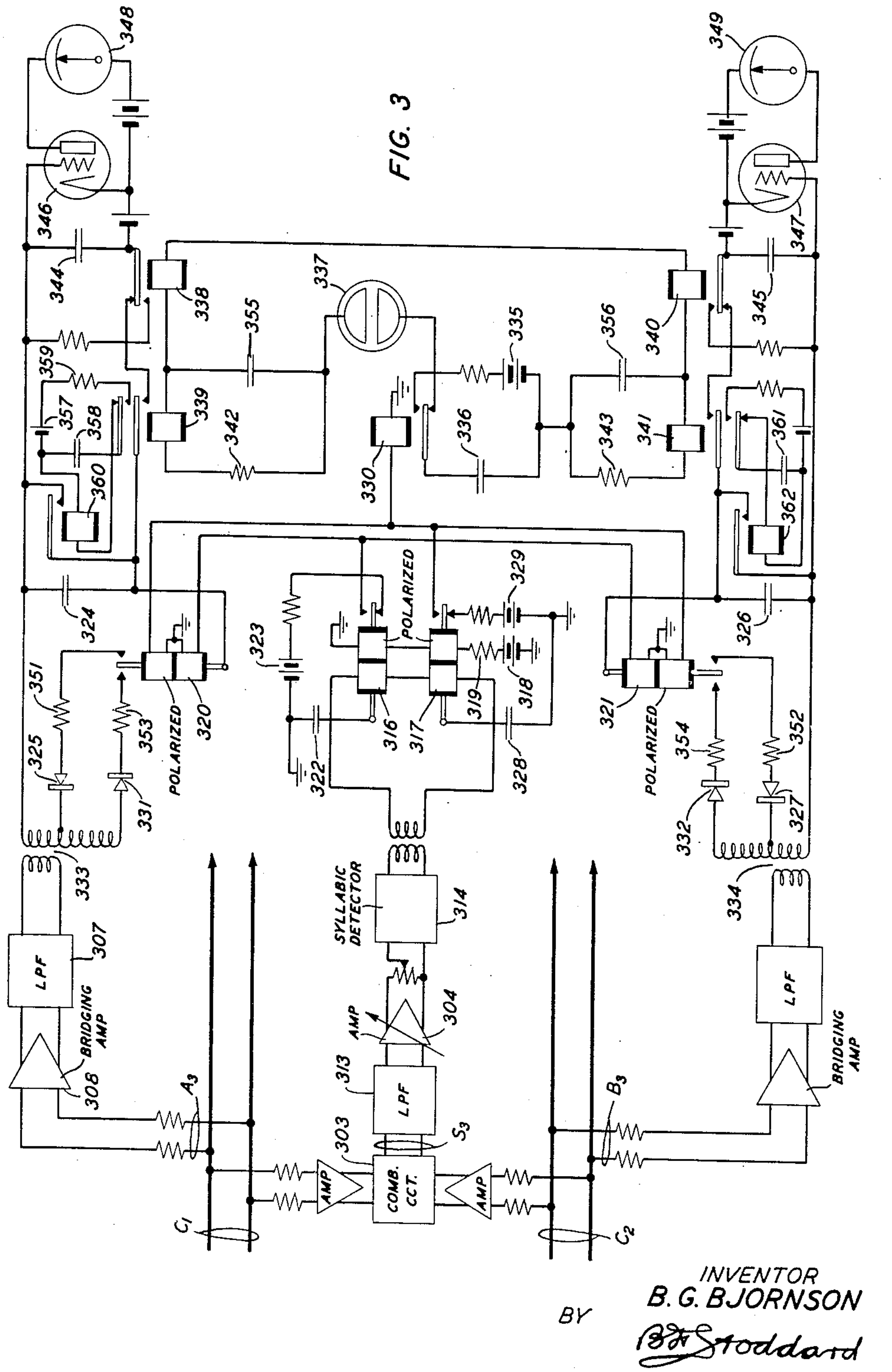
Fig. 3 shows in detail an improved circuit for measuring the relative signal-to-noise ratio of each channel of a multichannel radio telephone diversity receiving system.

Fig. 3 shows a portion of a radio telephone receiving system having two diversity receiving channels $C_1$ and $C_2$ carrying speech waves and the usual accompanying noise waves. Connected across channel $C_1$ is a measuring circuit $A_3$ comprising a bridging amplifier 308, a low-pass filter 307, a transformer 333, a meter 348, and other apparatus. A similar measuring circuit $B_3$ is connected across channel $C_2$. Connected across both channels $C_1$ and $C_2$ is a combining circuit 303 which has its output connected to a syllabic switching circuit $S_3$ which is essentially similar to the syllabic switching circuit S shown in detail in Fig. 1.

In the operation of this system, speech currents from channels $C_1$ and $C_2$, as combined in the combining circuit 303, pass through the low-pass filter 313 and amplifier 304 to cause the syllabic detector circuit 314, which is similar to the syllabic detector circuit 14 shown in detail in Fig. 1, to operate in the manner described above in connection with the description of the operation of the system shown in Fig. 1. The output of the syllabic detector circuit 314 is coupled to two polarized switching relays 316 and 317 which have their biasing windings supplied in series with biasing current from battery 318 through a resistance 319. The biasing windings of relays 316 and 317 are connected in reverse order so that only one of them will operate its armature at any one time. During the initial, or rising part of the first speech syllable, relay 316 operates its armature to its upper contact to close the discharge circuit of a condenser 322 which has been previously charged by a battery 323. Condenser 322 constitutes a pulsing device as its discharge energy passes over the armature of relay 316 to the operating windings of two polarized pulsing relays 320 and 321 and causes them to operate their armatures to their right contacts where they remain for a preassigned period of time determined by the time required for condenser 322 to complete its discharge.

When relay 320 operates its armature, it closes a charging circuit for a small condenser 324 in the upper measuring circuit $A_3$, the charging circuit including a large resistance 351, a rectifier 325, and a portion of the secondary winding of the transformer 333. The operation of the armature of relay 321 closes a similar charging circuit for a small condenser 326 in the lower measuring circuit $B_3$, this charging circuit comprising a large resistance 352, a rectifier 327, and a portion of the secondary winding of the transformer 334. The currents present in the measuring circuits $A_3$ and $B_3$, as rectified by their respective rectifiers 325 and 327, will now charge their respective condensers 324 and 326 in the same direction and for the same length of time. The magnitude of the charge on each condenser is substantially determined by the amplitude of the speech currents present in its particular measuring circuit during this period of time. The portions of the secondary windings of the transformers 333 and 334 that are included in these charging circuits are selected in such a way that the voltages stored on the plates of condensers 324 and 326 will be about zero when normal, or average, signal-to-noise ratio conditions exist in channels $C_1$ and $C_2$.

During the latter, or falling, part of the first speech syllable from the combining circuit 303, the current in the operating winding of relay 316 will fall to such a low value that the current in its biasing winding will predominate and will cause relay 316 to operate its armature to its lower contact to close the charging circuit of condenser 322. At about this time, the current in the operating winding of relay 317 will predominate and will cause relay 317 to operate its armature to its upper contact to close the discharge circuit of condenser 328 which has been previously charged by the battery 329. The discharge energy from condenser 328 passes through the biasing windings of the pulsing relays 320 and 321 and also through the winding of a stepper relay 330 which operates its armature to its upper contact to close a circuit for current from battery 335 to charge a stepper condenser 336. The pulsing relays 320 and 321 will now operate their armatures to their left contacts to close reverse charging circuits for condensers 324 and 326. The reverse charging circuit for condenser 324 includes a large resistance 353, a rectifier 331, and the entire secondary winding of transformer 333. Similarly, the reverse charging circuit for condenser 326 includes a large resistance 354, a rectifier 332, and the entire secondary winding of transformer 334. Condenser 324 is prevented from discharging through the rectifier 331 and condenser 326 is prevented from discharging through the rectifier 332 due to the resistance of the secondary windings of their respective associated transformers 333 and 334.

The armatures of relays 320 and 321 will remain operated against their left contacts for the duration of the discharge pulse from condenser 328. The currents present in the measuring circuit $A_3$ and $B_3$ during this period of time are rectified by rectifiers 331 and 332, respectively, and the resulting energies are applied to charge condensers 324 and 326, respectively, in the opposite direction from the charges previously applied by rectifiers 325 and 327. This produces a change in the voltage stored on the plates of condensers 324 and 326 which is proportional to the average alternating current voltages present in their respective measuring circuits $A_3$ and $B_3$ during this time regardless of the voltages already stored in these condensers. Since this reverse charging operation occurs during the latter, or falling, portion of a syllable, the speech currents are of negligible magnitude at this time. Therefore, the magnitude of the changes in the voltage stored on the plates of condensers 324 and 326 is determined principally by the magnitude of the noise currents present in their respective measuring circuits $A_3$ and $B_3$ during this time.

When the pulsing device, constituted by condenser 328 has completed its discharge, the armatures of relays 320 and 321 will move to their normally unoperated position midway between their contacts. As relay 330 is made more sensitive than either relay 320 or relay 321, it will hold its armature operated for a slightly longer period of time than relays 320 and 321.

This sequence of operations will be repeated during the following speech syllables and, during this time, condensers 324 and 326 will integrate the various charges of opposite polarity that are applied thereto. By the time the third of these cycles of operations has been completed, the stepper condenser 336 will have stored on its plates sufficient voltage to enable it, by its discharge after relay 330 releases its armature, to effect the breakdown of the gas-filled trigger tube 337 which, in turn, briefly energizes relays 338, 339, 340, and 341 to effect the momentary operation of their armatures. The relative sensitivities of relays 338, 339, 340 and 341 are so adjusted and the values of resistances 342 and 343 and capacitances 355 and 356 are so selected as to delay the operation of the armatures of relays 339 and 341 until after relays 338 and 340 have released their armatures.

Thus, when tube 337 first breaks down, the resulting initial high surge current energizes relays 338 and 340 and causes them to operate their armatures. The operation of the armature of relay 338 to its front contact at this time closes a discharge circuit for condenser 344 and the operation of the armature of relay 340 to its front contact closes a similar discharge circuit for condenser 345. After the armature of relay 338, 339, 340, and 341 to effect the momentary gage its back contact, relay 339 will operate its armatures. Operation of the lower armature of relay 339 completes a circuit for condenser 324 to discharge and transfer its accumulated integrated charges to condenser 344. Similarly, after the armature of relay 340 has been released and moved back to engage its back contact, relay 341 will operate its armatures and the operation of its upper armature will complete a circuit for condenser 326 to discharge and share its integrated charges with condenser 345. Condensers 344 and 345 are selected to be small in comparison with condensers 324 and 326 to insure that they will charge to about the same voltage as their respective associated condensers 324 and 326.

The charges from condensers 324 and 326 that are now transferred to condensers 344 and 345, respectively, change the potentials on the grids of the triodes 346 and 347 in their respective indicating circuits thereby effecting variations in the plate circuits of these tubes. This, in turn, produces new deflections of the indicators of meters 348 and 349 which indicate the relative average signal-to-noise ratios of the two channels $C_1$ and $C_2$ during the three preceding pulse periods. If the deflection of the indicator of one meter is greater than that of the other meter, it signifies that the channel associated with the meter having the greater deflection has the higher signal-to-noise ratio.

Any residual charges which might remain on condensers 324 and 326 after they have shared their charges with condensers 344 and 345 in their respective indicating circuits would always be small. However, any such residual charges that may exist are removed by means of the supplementary discharge circuits which are closed in response to the operation of the outer armatures of relays 339 and 341, respectively. The operation of the outer armature of relay 339 closes a circuit for current from battery 357 to charge condenser 358 through resistance 359. When relay 339 later releases its two armatures, the outer armature will close a circuit for condenser 358 to discharge through the winding of relay 360. This energizes relay 360 which operates its armature to close the supplementary discharge circuit across condenser 324 to remove completely any residual charge which may remain on its plates. At the end of the discharge pulse from condenser 358, relay 360 will release its armature thereby opening this supplementary discharge circuit. A similar procedure is followed by condenser 361 and relay 362 in the measuring circuit $B_3$.

During the pulse periods when condensers 324 and 326 are storing charges of opposite polarity applied alternately by their respective associated rectifiers 325, 331, 327, and 332, leakage is kept at a low value due to the fact that resistances 351, 353, 352, and 354 are so large that leakage during each operating interval, which is only about 0.04 second, is negligible. In other words, the time constant of each charging circuit is high because the respective resistances 351, 353, 352, and 354 are so large that the voltage on each of condensers 324 and 326 will rise only to about 10 per cent or 15 per cent of the voltage applied during each charging period. Then, when relays 320 and 321 operate their armatures to their other contacts, condensers 324 and 326 will each lose only the same small fraction of their accumulated charges during the next charging period.

Figure 4:
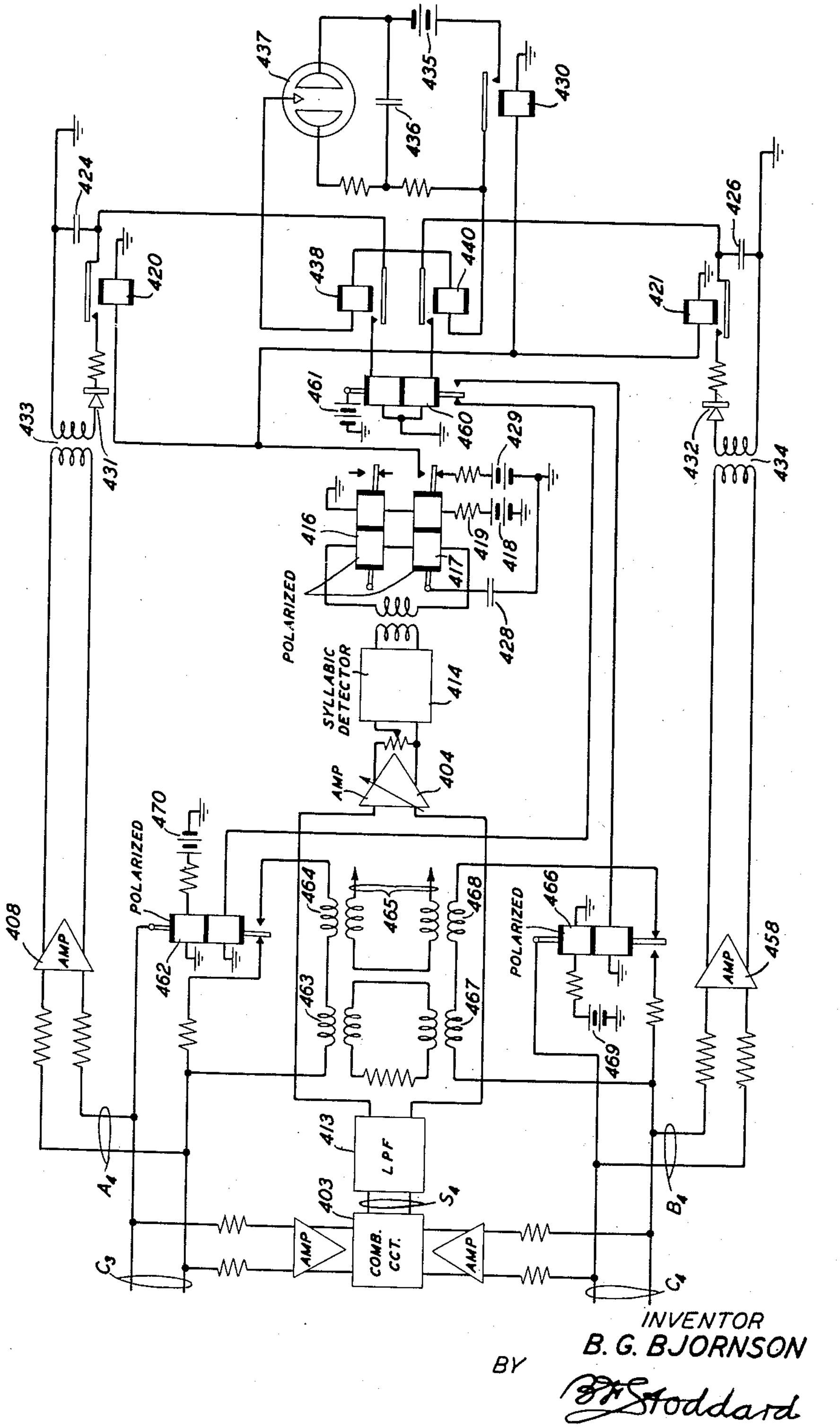
Fig. 4 shows in detail an improved circuit for automatically selecting the channel having the least noise in a multichannel radio telephone diversity receiving system.

Fig. 4 shows a portion of a radio telephone receiving system having two diversity receiving channels $C_3$ and $C_4$ carrying speech waves and the usual accompanying noise waves and provided with means for automatically disabling the channel having the greater average noise. These means comprise two measuring circuits $A_4$ and $B_4$ and a syllabic switching circuit $S_4$. The measuring circuit $A_4$ is connected across channel $C_3$ and includes an amplifier 408, a transformer 433, a rectifier 431, a pulsing relay 420, and a condenser 424. The measuring circuit $B_4$ is connected across channel $C_4$ and includes an amplifier 458, a transformer 434, a rectifier 432, a pulsing relay 421, and a condenser 426. The input to the syllabic switching circuit $S_4$ is supplied from a combining circuit 403 which is connected across both channels $C_3$ and $C_4$.

In the operation of this system, speech currents and the usual accompanying noise currents from both channels $C_3$ and $C_4$, as combined in the combining circuit 403, pass through a low-pass filter 413 and the amplifier 404 to operate the syllabic detector circuit 414 which is similar in construction and operation to the syllabic detector circuit 14 described above in connection with the description of the system shown in Fig. 1. The output of the syllabic detector circuit 414 is coupled to two polarized switching relays 416 and 417 which have their biasing windings connected in reverse order and supplied in series with biasing current from battery 418 through a resistance 419. Since the object of this system is to disable the channel having the greater average noise currents, relay 416 serves no useful purpose in this system as it operates when speech is at a maximum. On the other hand, since relay 417, like relay 17 in the system of Fig. 1, operates its armature during the latter, or falling, part of a speech syllable when speech is at a minimum, it is used to control the operation of the measuring circuits $A_4$ and $B_4$.

This is accomplished by charging a condenser 428 with current from a battery 423 over a circuit including the armature and bottom contact of relay 417 during periods when relay 417 is not energized. When relay 417 becomes energized and operates its armature to its top contact, a circuit is closed for the condenser 428 to discharge through the winding of the stepper relay 430 and the windings of the pulsing relays 420 and 421. In response to the flow of this discharge current, the stepper relay 430 operates its armature to close a path for current from battery 435 to charge a stepper condenser 436. At the same time, the pulsing relays 420 and 421 operate their armatures to complete, respectively, the charging circuits extending from rectifier 431 to condenser 424 and from rectifier 432 to condenser 426. The electric wave energy that is present at this time in the measuring circuits $A_4$ and $B_4$ will be rectified by the rectifiers 431 and 432, respectively, and this rectified energy will be applied to the plates of condensers 424 and 426, respectively.

The value of the voltages thus applied to condensers 424 and 426 is determined by the magnitude of the electric wave energy present in channels $C_3$ and $C_4$, respectively, during this charging period. Since the armature of the switching relay 417 is operated to its top contact during the falling part of a speech syllable, the energy present in channels $C_3$ and $C_4$ during the charging period will consist predominately of noise currents. Therefore, the amount of voltage stored on the plates of condensers 424 and 426 will be determined chiefly by the amount of noise present in channels $C_3$ and $C_4$, respectively, during this period of time.

After condenser 428 has completed its discharge, the pulsing relays 420 and 421 will release their armatures. As relay 430 is made more sensitive than either relays 420 and 421, it will hold its armature operated for a slightly longer period of time than relays 420 and 421.

This cycle of charging operations is repeated during the following speech syllables until the magnitude of the charges stored on the plates of condenser 436 is sufficient to effect the breakdown of the gas-filled trigger tube 437. In a preferred embodiment of the invention, the voltage stored on the plates of condenser 436 will reach the striking potential of the gas-filled tube 437 at the end of the fourth charging period. Since the stepper relay 430 holds its armature operated for a fixed period of time after the pulsing relays 420 and 421 have released their armatures, the breakdown of tube 437 will complete a circuit for current from battery 435 to flow for a short time over the armature of relay 430, through the windings of relays 440 and 438, and then through the anode circuit of tube 437. This causes relay 438 to operate its armature to close a circuit for condenser 424 in the measuring circuit $A_4$ to discharge its accumulated charges through the upper winding of the differential selector relay 460. At the same time relay 440 operates its armature to close a similar circuit for condenser 426 in the measuring circuit $B_4$ to discharge its accumulated charges through the lower winding of relay 460.

As the magnitude of the discharge current from condenser 424 is a function of the accumulated voltages stored on its plates during the preceding pulse periods, and as the magnitude of these voltages was determined principally by the magnitude of the noise currents present in channel $C_3$ during these pulse periods, then it follows that the magnitude of this discharge current represents a measure of the noise-currents that were present in channel $C_3$ during these pulse periods. Similarly, the magnitude of the discharge current from condenser 426 represents a measure of the noise currents that were present in channel $C_4$ during the same pulse periods. Therefore, the condenser associated with the channel having the greater noise during these pulse periods will have the larger discharge current and will control the direction in which the armature of the differential selector relay 460 is operated. For example, if the noise level in channel $C_3$ was higher during these periods than the noise level in channel $C_4$, then the armature of relay 460 will be operated against its left contact as shown in Fig. 4. On the other hand, if channel $C_4$ had the higher noise level, then relay 460 would operate its armature against its right contact. In either case, since relay 460 is not biased, its armature will remain against the selected contact until the noise conditions in the two channels $C_3$ and $C_4$ become reversed and cause it to be operated to the opposite contact.

When the noise level in channel $C_3$ is the greater and relay 460 has operated its armature against its left contact, as is shown in Fig. 4, a circuit is closed for current from battery 461 to flow through the operating winding of a channel control relay 462. This causes relay 462 to operate its armature against its left contact, thereby closing a shunt path across channel $C_3$ and, at the same time, opening the circuit leading from one side of channel $C_3$ through the transfer coils 463 and 464. Channel $C_3$ is thus virtually disabled as it is now disconnected from the input circuit 465 leading to the speech receiving equipment. During this time, the circuit through the operating winding of the channel control relay 466 in channel $C_4$ is open at the right contact of the selector relay 460. Accordingly, biasing current from battery 469 will hold the armature of relay 466 against its right contact, as shown in Fig. 4, to connect channel $C_4$ to the transfer coils 467 and 468 which transfer the electric wave energy in channel $C_4$ to the input circuit 465 of the speech receiving equipment.

If the noise conditions in channels $C_3$ and $C_4$ become reversed so that channel $C_4$ has a higher noise level than channel $C_3$, the selector relay 460 will operate its armature to its right contact to apply current from battery 461 to the operating winding of relay 466. This will cause relay 466 to operate its armature to its left contact thereby, in effect, disabling channel $C_4$ by disconnecting it from the transfer coils 467 and 468. Since the circuit through the operating winding of relay 462 will now be open at the left contact of relay 460, biasing current from battery 470 will cause relay 462 to operate its armature against its right contact to connect channel $C_3$ to the transfer coils 463 and 464 associated with the speech input circuit 465. Thus, throughout the operation of this diversity receiving system, the channel having the greater noise level is automatically disabled, or discriminated against, by being virtually disconnected from the speech input circuit 465.

What is claimed is:

1. In combination, a syllabic detector having an input circuit and an output circuit, supply means for supplying speech currents and noise currents to said detector input circuit, a relay having an operating winding coupled to said detector output circuit, biasing means adapted to bias said relay to be operatively responsive to curent flowing in only a preassigned direction in said detector output circuit, a pulsing device, said relay being adapted to control the operation of said pulsing device, a sampling circuit coupled to said supply means, and an instrumentality for controlling the operation of said sampling circuit, said pulsing device being adapted to actuate said instrumentality.

2. In combination in a radio receiving system having a receiving channel for receiving speech currents combined with incidental noise currents, a syllabic detector having an input circuit supplied with speech and noise currents from said channel and having an output circuit, a relay having an operating winding coupled to said detector output circuit, biasing means adapted to bias said relay to be operatively responsive to current of only a preselected polarity from said detector output circuit, a pulsing device, said relay being adapted to control the operation of said pulsing device, a sampling circuit coupled to said channel, a capacitor bridged across said sampling circuit, and control means for applying an electric charge to said capacitor, said pulsing device being adapted to actuate said control means.

3. In combination in a radio receiving system having a receiving channel for receiving speech currents combined with incidental noise currents, a syllabic detector having an input circuit supplied with speech and noise currents from said channel and having an output circuit, a relay having an operating winding coupled to said detector output circuit, biasing means adapted to bias said relay to be operatively responsive to current of only a preselected polarity from said detector output circuit, a first pulsing device, a second pulsing device, said relay being adapted to control the operation of said pulsing devices, a sampling circuit coupled to said channel, a capacitor bridged across said sampling circuit, control means for controlling the application of an electric charge to said capacitor, said first pulsing device being adapted to actuate said control means, a discharge circuit for said capacitor, and an instrumentality for controlling said discharge circuit, said second pulsing device being adapted to actuate said instrumentality.

4. In combination in a radio receiving system having a receiving channel for receiving speech currents combined with incidental noise currents, a syllabic detector having an input circuit supplied with speech and noise currents from said channel and having an output circuit, a relay having on operating winding coupled to said detector output circuit, biasing means adapted to bias said relay to be operatively responsive to current flowing in only a preassigned direction in said detector output circuit, a first pulsing device, a sampling circuit coupled to said channel, a first capacitor bridged across said sampling circuit, control means for controlling the application of an electric charge to said first capacitor, a second capacitor, means for applying an electric charge to said second capacitor during periods of operation of said relay, a gas-filled trigger tube, circuit means for discharging said second capacitor through said tube to effect its breakdown after said second capacitor has been charged a predetermined number of times, a discharge circuit for said first capacitor, and an instrumentality for controlling said discharge circuit, said gas-filled trigger tube being adapted upon its breakdown to actuate said instrumentality.

5. In combination in a diversity radio receiving system having two diversity receiving channels for receiving speech currents combined with incidental noise currents, a syllabic detector having an input circuit supplied with speech and noise currents from both of said channels and having an output circuit, a relay having an operating winding coupled to said detector output circuit, a source of biasing current, said relay also having a biasing winding connected to said source of biasing current for adapting said relay to respond to current flowing in only a preassigned direction in said detector output circuit, a first capacitor, a second capacitor, a first charging circuit for applying an electric charge to the first condenser which is dependent chiefly upon the magnitude of noise currents in one of said channels, a second charging circuit for applying an electric charge to the second condenser which is dependent chiefly upon the magnitude of noise currents in the other of said channels, and pulsing means for controlling said charging circuits, said relay being adapted to actuate said pulsing means.

6. In combination in a diversity radio receiving system having two diversity receiving channels for receiving speech currents, a syllabic detector having an input circuit supplied with speech currents from both of said channels and having an output circuit, a relay having an operating winding coupled to said detector output circuit, biasing means for adapting said relay to respond to current in said detector output circuit having only a preassigned polarity, a pulsing device, a first sampling circuit coupled to one of said channels, a second sampling circuit coupled to the other said channels, and control means for controlling the operation of said sampling circuits, said pulsing device being adapted to actuate said control means.

7. In a diversity radio receiving system having two diversity receiving channels for receiving speech currents combined with incidental noise currents, automatic selecting means for periodically selecting the channel having the least noise currents and for rendering the other channel ineffectual, said automatic selecting means comprising in combination a syllabic detector having an input circuit supplied with currents from both of said channels and having an output circuit, a relay having an operating winding coupled to said detector output circuit, said relay being adapted to be operatively responsive to current of one polarity in said detector output circuit, biasing means for preventing said relay from being operatively responsive to current of the opposite polarity in said detector output circuit, means connected to each of said channels for producing unidirectional potentials proportional to the currents in said channels during periods when said relay is operated, differential means for determining which of said unidirectional potentials is the greater, and control means for rendering ineffectual the channel from which the greater unidirectional potential was derived.

8. In combination in a diversity radio receiving system having two diversity receiving channels for receiving speech currents combined with incidental noise currents, a syllabic detector having an input circuit supplied with speech and noise currents from both of said receiving channels and having an output circuit, a relay having an operating winding coupled to said detector output circuit, biasing means so constructed and arranged that said relay is adapted to be operatively responsive to current flowing in only a preassigned direction in said detector output circuit, a first capacitor having a discharge circuit, a second capacitor having a discharge circuit, charging means for applying an electric charge to said first capacitor which is dependent chiefly upon the magnitude of noise currents in one of the channels and for applying an electric charge to said second capacitor which is dependent chiefly upon the magnitude of noise currents in the other of said channels, said relay being adapted to control the operation of said charging means, differential means connected to both of said discharge circuits, pulsing means for controlling said discharge circuits, said relay being adapted to control the operation of said pulsing means, and disabling means for selectively disabling said channels alternately, said differential means being adapted to control the operation of said disabling means.

9. In a radio telephone receiving system having a plurality of receivers tuned to receive a common signal frequency, means for comparing the outputs of two of said receivers, said means comprising combining means for combining parts of the outputs of said two receivers, a syllabic detector having an input circuit and an output circuit, supply means for supplying said combined outputs to said detector input circuit, sampling means for taking samples of the electric wave energy present in the outputs of each of said two receivers, selecting means for effecting the operation of the sampling means during periods when noise energy is of maximum effect in the output circuits of said two receivers, operating means for operating said selecting means with certain portions of the electric wave energy from said detector output circuit, and means for deriving a unidirectional potential from each of said samples that is substantially proportional to the value of the noise energy that was present in their respective receiver output circuits when said samples were taken.

10. In a radio telephone receiving system having a plurality of receivers tuned to receive a common signal frequency, means for comparing the outputs of two of said receivers, said means comprising combining means for combining parts of the outputs of said two receivers, a syllabic detector having an input circuit and an output circuit, supply means for supplying said combined outputs to said detector input circuit, sampling means for taking samples of the electric wave energy present in the outputs of each of said two receivers, selecting means for effecting the operation of the sampling means during periods when noise energy is of maximum effect in the output circuits of said two receivers, operating means for operating said selecting means with certain portions of the electric wave energy from said detector output circuit, two condensers, means for charging one condenser with a sample taken from one of said two receiver outputs, means for charging the other condenser with a sample taken from the other of said two receiver outputs, each of said condensers having a discharge circuit, and control means for effecting the discharge of said two condensers simultaneously.

11. In a radio telephone receiving system having a plurality of receivers tuned to receive a common signal frequency, means for comparing the outputs of two of said receivers, said means comprising combining means for combining parts of the outputs of said two receivers, a syllabic detector having an input circuit and an output circuit, supply means for supplying said combined outputs to said detector input circuit, sampling means for taking samples of the electric wave energy present in the outputs of each of said two receivers, selecting means for effecting the operation of the sampling means during periods when noise energy is of maximum effect in the output circuits of said two receivers, operating means for operating said selecting means with certain portions of the electric wave energy from said detector output circuit, two condensers, means for charging one condenser with samples taken from one of said two receiver outputs, means for charging the other condenser with samples taken from the other of said two receiver outputs, each of said condensers having a discharge circuit, control means for effecting the discharge of said two condensers simultaneously, timing means for operating said control means after a preassigned number of samples have been taken, and means for placing said timing means under the control of said selecting means.

12. In a radio telephone receiving system having a plurality of receivers tuned to receive a common signal frequency, means for selecting the receiver having the least noise in its output, said means comprising combining means for combining parts of the outputs of said receivers, a syllabic detector having an input circuit and an output circuit, supply means for supplying said combined outputs to said detector input circuit, sampling means for taking samples of the electric wave energy present in the outputs of said receivers, selecting means for effecting the operation of the sampling means during periods when noise energy is of maximum effect in the output circuits of said receivers, operating means for operating the selecting means with certain portions of the electric wave energy from said detector output circuit, means for deriving a unidirectional potential from each of said samples that is substantially proportional to the magnitude of the noise energy that was present in their respective receiver output circuits when said samples were taken, differential means, and means for selectively operating said differential means in accordance with the largest of said unidirectional potentials.

13. In a radio telephone receiving system having a plurality of receivers tuned to receive a common signal frequency, means for selecting the receiver having the least noise in its output, said means comprising combining means for combining parts of the outputs of said receivers, a syllabic detector having an input circuit and an output circuit, supply means for supplying said combined outputs to said detector input circuit, sampling means for taking samples of the electric wave energy present in the outputs of said receivers, selecting means for effecting the operation of the sampling means during periods when noise energy is of maximum effect in the output circuits of said receivers, operating means for operating the selecting means with certain portions of the electric wave energy from said detector output circuit, a plurality of condensers, means for charging each condenser with a plurality of samples taken from a different one of said receiver outputs, each of said condensers having a discharge circuit, control means for effecting the discharge of said condensers simultaneously, timing means for operating said control means after a preassigned number of successive samples have been taken, means for placing said timing means under the control of said selecting means, disabling means for selectively disabling all but one of said receiver outputs, differential means for controlling the operation of said disabling means, and means for connecting said condenser discharge circuits to said differential means for controlling its operation.

14. A diversity radio receiving system having two diversity receiving channels for receiving speech currents combined with incidental noise currents and characterized by having channel selecting means for selecting the channel having the least noise currents, said channel selecting means comprising sampling means for sampling the electric wave energy present in each channel during the intervals between successive speech syllables, integrating means for separately integrating a preassigned number of samples taken from each channel, and disabling means for disabling the channel which produces integrated samples of the larger magnitude.

15. A diversity radio receiving system having two diversity receiving channels for receiving speech currents combined with the usual accompanying noise currents and characterized by having channel selecting means for selecting the channel having the least noise currents, said channel selecting means comprising sampling means for sampling the electric wave energy present in each channel during the intervals between successive speech syllables, integrating means for separately integrating a preassigned number of samples taken from each channel, differentiating means for differentiating between the integrating samples from each channel in respect to their magnitudes, and disabling means for disabling the channel from which was taken the samples having the larger integrated magnitude.

16. A diversity radio receiving system having two diversity receiving channels for receiving speech currents combined with noise currents and characterized by having channel selecting means for selecting the channel having the least noise currents, said channel selecting means comprising sampling means for sampling the electric wave energy present in each channel for a short uniform period of time during the intervals between successive speech syllables, integrating means for continuously integrating separately a uniform number of samples taken from each channel, differentiating means for continuously differentiating between the integrated samples from each channel in respect to their magnitudes, and disabling means for continuously disabling which ever channel produces integrated samples of the larger magnitude.

17. In combination, a communication channel carrying speech currents and incidental noise currents, a normally open sampling circuit for sampling the electric wave energy present in said channel, and control means for closing said normally open sampling circuit for a short uniform period of time during the intervals between successive speech syllables, said control means including a syllabic detector having an input circuit and an output circuit, supply means for supplying said input circuit with a portion of the speech and noise currents carried by said communication channel, a polarized relay having an operating winding coupled to said output circuit and also having an armature and contact, and a pulsing circuit connected to said contact and adapted to produce an electric current impulse of fixed duration each time said polarized relay operates its armature against its contact.

18. In a diversity receiving communication system, a plurality of receiving channels, each for conveying the same speech waves and their accompanying noise wave content, a common speech wave channel for interconnection with either of said receiving channels, means associated with each of said receiving channels for deriving electric energy respective to each of said receiving channels representative of the noise content thereof, and means responsive to said derived electric energy for interconnecting the receiving channel of least noise content to said common speech wave channel to the exclusion of the other receiving channel.

19. In a diversity receiving communication system, a plurality of receiving channels, each for conveying the same speech waves and their accompanying noise wave content, a common speech wave channel for interconnection with either of said receiving channels, means coupled to each of said receiving channels for consecutively sampling the noise content thereof, and means responsive to the difference in the relative noise contents of said receiving channels during an assigned interval of time for interconnecting the receiving channel of least noise content to said common speech wave channel to the exclusion of the other receiving channel.

20. In a diversity receiving communication system, a plurality of receiving channels for passage of substantially the same band of voice frequency signals and their accompanying noise frequencies, a common utilization path for interconnection with any one of said channels, means respective each channel for deriving an electric quantity representative of the noise frequency content therein, comparison means for comparing said noise representative quantities, and connecting means for interconnecting said utilization path and only that one of said receiving channels having the least noise content, said comparison means being adapted to control the operation of said connecting means.

21. The combination set forth in claim 1 and having a second relay with an operating winding coupled to said detector output circuit, said biasing means being also adapted to bias said second relay to be operatively responsive only to current flowing in said detector output circuit in a direction opposite to said preassigned direction, a second pulsing device, said second relay being adapted to control the operation of said second pulsing device, and a second instrumentality for sharing control of the operation of said sampling circuit alternatively with the first-mentioned instrumentality, said second pulsing device being adapted to actuate said second instrumentality.

22. The combination set forth in claim 1 and having a second relay with an operating winding coupled to said detector output circuit, said biasing means being also adapted to bias said second relay to be operatively responsive only to current flowing in said detector output circuit in a direction opposite to said preassigned direction, a second pulsing device, said second relay being adapted to control the operation of said second pulsing device, and a second instrumentality for discontinuing control of the operation of said sampling circuit by the first-mentioned instrumentality, said second pulsing device being adapted to actuate said second instrumentality.

23. The combination set forth in claim 1 and having a second relay with an operating winding coupled to said detector output circuit, said biasing means being also adapted to bias said second relay to be operatively responsive only to current flowing in said detector output circuit in a direction opposite to said preassigned direction, and a second pulsing device adapted to actuate said instrumentality alternatively with the first-mentioned pulsing device but in a direction opposite to that in which it is actuated by said first pulsing device, said second relay being adapted to control the operation of said second pulsing device.

24. The combination set forth in claim 1 and having a second relay with an operating winding coupled to said detector output circuit, said biasing means being also adapted to bias said second relay to be operatively responsive only to current flowing in said detector output circuit in a direction opposite to said preassigned direction, a second pulsing device adapted to actuate said instrumentality alternatively with the first-mentioned pulsing device but in a direction opposite to that in which it is actuated by said first pulsing device, said second relay being adapted to control the operation of said second pulsing device, said sampling circuit including a capacitor, first charging means for charging said capacitor in one direction, and second charging means for charging said capacitor in the opposite direction, said first charging means being adapted to charge said capacitor in response to the actuation of said instrumentality in one direction and said second charging means being adapted to charge said capacitor in response to the actuation of said instrumentality in the opposite direction.

25. The combination set forth in claim 1 and having a second relay with an operating winding coupled to said detector output circuit, said biasing means being also adapted to bias said second relay to be operatively responsive only to current flowing in said detector output circuit in a direction opposite to said preassigned direction, a second pulsing device adapted to actuate said instrumentality alternatively with the first-mentioned pulsing device but in a direction opposite to that in which it is actuated by said first pulsing device, said second relay being adapted to control the operation of said second pulsing device, said sampling circuit including a capacitor, first charging means for charging said capacitor in one direction, second charging means for charging said capacitor in the opposite direction, said first charging means being adapted to charge said capacitor in response to the actuation of said instrumentality in one direction and said second charging means being adapted to charge said capacitor in response to the actuation of said instrumentality in the opposite direction, said capacitor having a normally open discharge circuit, and control means for closing said discharge circuit only after said instrumentality has been actuated a preselected number of times, said first-mentioned pulsing device being adapted to effect the operation of said control means.

BJORN G. BJORNSON.

REFERENCES CITED

The following references are of record in the file of this patent:

UNITED STATES PATENTS

| Number | Name | Date |
|---|---|---|
| 2,166,995 | Koch | July 25, 1939 |
| 2,379,799 | Haigis | July 3, 1945 |
| 2,384,456 | Davey | Sept. 11, 1945 |